United States Patent [19]

Howard

[11] 4,226,890

[45] Oct. 7, 1980

[54] MEAT ANALOG COMPOSITIONS

[75] Inventor: Norman B. Howard, Oxford, Ohio

[73] Assignee: The Procter & Gamble Company, Cincinnati, Ohio

[21] Appl. No.: 900,956

[22] Filed: Apr. 28, 1978

[51] Int. Cl.$^2$ .............................................. A23J 3/00
[52] U.S. Cl. .................................... 426/92; 426/104; 426/613; 426/654; 426/656; 426/662; 426/802; 426/804
[58] Field of Search .................. 426/93, 99, 104, 656, 426/802, 654, 662, 603, 604, 612, 613, 650, 804, 92, 250, 646

[56] References Cited

U.S. PATENT DOCUMENTS

| | | | |
|---|---|---|---|
| 2,089,470 | 8/1937 | Epstein et al. | 426/604 |
| 2,115,088 | 4/1938 | Schwieger | 426/662 |
| 2,524,291 | 10/1950 | Hoffman | 426/662 X |
| 2,802,737 | 8/1957 | Anson et al. | 426/656 X |
| 2,890,959 | 6/1959 | Phillips | 426/603 X |
| 3,353,965 | 11/1967 | Patterson | 426/656 X |
| 3,493,387 | 2/1970 | Swicklik | 426/662 X |
| 3,519,436 | 7/1970 | Bauer et al. | 426/603 X |
| 3,702,307 | 11/1972 | Norris | 426/654 |
| 3,895,117 | 7/1975 | Backlund | 426/654 X |
| 4,052,517 | 10/1977 | Youngquist | 426/104 X |

OTHER PUBLICATIONS

Singleton et al., J. Amer. Oil Chem. Soc., vol. XXXV, No. 6, Jun. 1958, pp. 265-270.

Primary Examiner—Esther M. Kepplinger
Attorney, Agent, or Firm—Jerry J. Yetter; Julius P. Filcik; Richard C. Witte

[57] ABSTRACT

A thermally stable low calorie hydrated emulsifier system which is used to deliver flavor, flavor precursors, color, color precursors, and lipids or mixtures thereof in a heated food or beverage product is disclosed. The emulsifiers that are useful in this composition are selected from the group consisting of polyglycerol monoesters of fatty acids, monoacylglycerol esters of dicarboxylic acids, sucrose monoesters of fatty acids, polyol monoesters of fatty acids, phospholipids, and mixtures thereof.

8 Claims, No Drawings

MEAT ANALOG COMPOSITIONS

BACKGROUND OF THE INVENTION

This invention relates to a stable emulsion system that can be used to deliver flavor, color or lipids in a cooked food product and/or to reduce caloric density of food products.

Food flavoring and coloring agents and lipids are added to foods directly or as macro emulsions, i.e. an oil-in-water or water-in-oil emulsion. These emulsions are generally not stable under cooking conditions, thus releasing the food additive component to be absorbed by or dissolved in the protein, fat or water present in the food.

Additionally, the addition of surface active or highly ionic additives affect the oil-water interfaces and can destabilize these macro emulsions. The instability of the emulsions under gravitational, thermal and additive conditions affects the flavor and color of the product.

Many flavor and color precursors develop the flavor or color at the oil/water interface. When the emulsion is destablized, the surface area of the interface is greatly reduced, thus affecting the flavor or color development. In addition, flavor volatiles are lost.

A simple system which could deliver flavor effectively and allow for color development under cooking conditions would be advantageous. If this system would also allow the incorporation of less lipids, in particular triglycerides, yet have the same "fat perception" in the product, a low calorie product having improved gustatory impression could be produced.

It is an object of the present invention to form an emulsifier system which is thermally and gravitationally stable under cooking conditions.

It is a further object of the present invention to produce a hydrated emulsifier system which allows flavor or color precursors to develop in microwave cooking of foods where a limited water situation is a prerequisite for the reactions to occur.

An additional object of this invention is the use of a hydrated emulsifier system to deliver less fat in a food product without affecting the flavor or "fat perception" of the product.

These and other objects will become evident in the detailed description which follows.

SUMMARY OF THE INVENTION

A stable hydrated emulsifier composition comprising:
(a) an emulsifier selected from the group consisting of polyglycerol monoesters of fatty acids; monoacylglycerol esters of dicarboxylic acids; sucrose monoesters of fatty acids; polyol monoesters of fatty acids; phospholipids; and mixtures thereof;
(b) water; and
(c) a food additive, such that said emulsifier is in a liquid crystalline state which is thermally stable at temperatures of from about 98° F. to about 200° F.

The process for preparing the emulsifier composition and its use in food products, in particular meat analogs, is also disclosed.

All percentages are by weight unless otherwise indicated.

DETAILED DESCRIPTION OF THE INVENTION

The key to the formation of a thermally and gravitationally stable emulsifier system to which both polar and non-polar food additives can be added is in the selection of an emulsifier system which, when hydrated, forms a stable, liquid crystalline state in the temperature region of 98° F. to 200° F.

The term "liquid crystalline" is synonymous with a "mesomorphic state", e.g., a lamellar or neat phase. It refers to a fluid state between the perfectly ordered structure found in solid crystals (emulsifier) and a disordered state in an amorphous structure, which shows a birefringence under polarized light.

By "food additive" is meant flavoring agents, coloring agents, fats, sugars, and other ingredients which are added to food products to enhance the color, flavor, or nutritive value of the product. Flavor and color precursors are included in this term. The use of fat (triglycerides) as a food additive in this system allows one to use less fat than would normally be present in the food or beverage.

By "comprising" is meant that other substances may be present in the emulsifier system so long as they do not preclude the formation of the liquid crystalline state and its thermal stability. This term encompasses the more restrictive terms "consisting of" and "consisting essentially of".

The emulsifiers which are useful herein are polyglycerol monoesters of fatty acids, monoacylglycerol esters of dicarboxylic acids, sucrose monoesters of fatty acids, polyol monoesters of fatty acids, phospholipids, and mixtures thereof.

By "fatty acid" or fatty acyl group is meant an aliphatic carboxylic acid having from about 12 to about 22 carbon atoms. The fatty acids can be saturated or unsaturated, and are preferably substantially saturated. Examples of these fatty acids are lauric, myristic, stearic, oleic, linoleic, linolenic, arachidic, behenic, erucic, and lignoceric. The latter named fatty acids contain at least about 22 carbon atoms.

Fatty acids per se or naturally occurring fats and oils can serve as the source of the fatty acid component of the emulsifiers used herein. For example, rapeseed oil provides a good source of $C_{22}$ fatty acids. The $C_{16}$–$C_{18}$ fatty acids can be provided by tallow, soybean oil, or cottonseed oil. The shorter chain fatty acids can be provided by coconut, palm kernel, or babassu oils. When using naturally occurring fats and oils as the fatty acid source, it is preferred that they be substantially completely hydrated, e.g. to an iodine value of less than about 10.

Polyglycerol monoesters suitable for use in the present invention have an average of from 2 to 10 glycerol units and an average of one fatty acid acyl group per glycerol moiety. Preferred polyglycerol esters have an average of 2 or 3 glycerol units and one fatty acyl group having from 14 to 18 carbons per polyglycerol moiety.

The polyglycerol essentially is a polymer which is formed by the dehydration of glycerol. For each unit of glycerol that is added to the polymer chain there is an increase of one hydroxyl group. In the practice of this invention, from about 1 to about 4 of these hydroxy groups of the polyglycerol molecule is esterified by reaction with fatty acids. This esterification is similar to that of glycerol or other polyols.

Sucrose monoesters of fatty acids are also useful herein. Sucrose monoesters of fatty acids are prepared by esterification of sucrose with a fatty acid or a fatty acid ester. The preferred sucrose monoesters are those having a fatty acyl group of from 14 to 18 carbon atoms.

Polyol monoesters of fatty acids suitable for use in the present invention are the sugar or sugar alcohols which have an average of one fatty acid group per molecule. Suitable polyols which can be esterified to produce these monoesters are xylitol, sorbitan, sorbitol, inositol, maltose, etc.

Monacyl glycerol esters of dicarboxylic acids are prepared by esterifying a dicarboxylic acid with a monoester of glycerol. The following formulas illustrate the type of monoacylglycerol esters of dicarboxylic acids which are preferred for use herein.

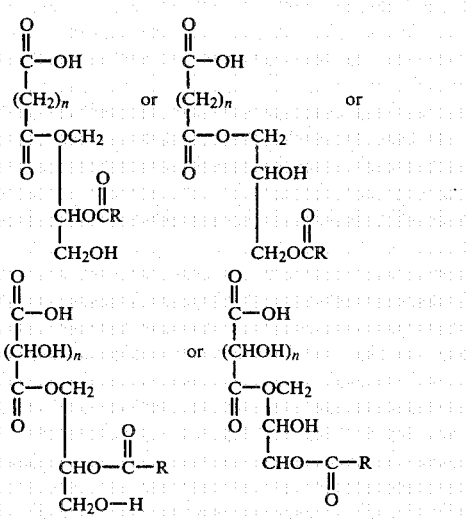

wherein R is an aliphatic saturated alkyl chain having from 8 to about 22 carbon atoms; and n is an integer from 1 to 4.

As is evident, the glycerol moiety may be esterified on the second or third carbon atoms. In actuality, the monoacylglycerol ester used to esterify the dicarboxylic acid will be a mixture of these two derivatives.

The dicarboxylic acids useful herein are those which are food approved. Examples of these are adipic, succinic, and preferably tartaric acid.

Phospholipid emulsifiers can also be used herein. A phospholipid is a compound which on hydrolysis yields phosphoric acid, an alcohol, fatty acid, and a nitrogenous base. They are widely distributed in nature and include such substances as lecithin, cephalin, and sphingomyelin. The lecithin phospholipids are the most highly preferred phospholipid for use herein, especially those derived from soybean oil.

As indicated above, the key to forming the stable emulsifier system of this invention is the selection of an emulsifier which on hydration produces a liquid crystalline or mesomorphic state which remains in that state when either polar or non-polar food additives are incorporated within it, and when the food product is warmed to temperatures of between 98° F. to 200° F.

The thermal stability of the instant hydrated emulsifier system is partially determined by the melting point of the emulsifier. When the product incorporating this system is to be heated to temperatures above the melting point of the emulsifier, the hydrated liquid crystalline phase can maintain its stability above the melting temperature of the anhydrous bulk emulsifier.

The type of food additives which can be incorporated into the hydrated emulsifier system without rendering it unstable are developed flavors, flavor precursors, colors, color precursors, and lipids. The food additive can be either water-soluble or lipid-soluble or soluble in both.

Natural or synthetic flavor additives and/or seasonings can be used. Spices such as sage, pepper, thyme, marjoram, oregano, etc., could be incorporated into the stable hydrated emulsifier system. Meat, poultry, or seafood flavors such as beef, pork, chicken, turkey, fish, and shrimp can also be added to the stable hydrated emulsifier system. Chocolate and natural or synthetic sweeteners are also useful herein.

The stable hydrated emulsifier system is particularly useful for the development of flavor from flavor precursors. Many food flavors are attributed to the reaction of amino acids, free fatty acids, and reducing sugars naturally occurring in the food. This is particularly true of the meat, poultry, and seafood flavors. The incorporation of the flavor precursors in the emulsifier system allows for a reaction to occur as though at the interface of the water and oil phases of the meat analog. Thus, the flavor is developed upon cooking just as in a natural meat product.

This same type of interaction can occur when color precursors are used. A meat analog product could be colored red, and then, upon cooking, a reaction of the color precursors occurs to produce a brown color.

When the food or beverage product in which the stable hydrated emulsifier system is used contains high amounts of oil or fat, e.g., 20% to 80%, an additional non-polar, oil soluble emulsifier is preferably added. The non-polar, oil soluble emulsifiers lend an additional stability to the stable, hydrated emulsifier composition.

The non-polar oil soluble emulsifiers useful herein are those which exhibit an α-phase crystalline structure. This crystalline phase is discussed in U.S. Pat. Nos. 2,521,242 and 2,521,243 issued Sept. 5, 1950.

The preferred non-polar oil soluble emulsifiers are the condensation product of a monoglyceride containing a fatty acid radical of from 14 to 22 carbon atoms and lactic, acetic, or citric acid, and the monoesters of propanediol, butanediols, and pentane diols with fatty acids containing from 12 to 22 carbon atoms. The preferred diol monoesters are those prepared from 1,2-propanediol, 1,3-propanediol, 1,4-butanediol, 1,3-butanediol and 1,5-pentanediol.

The monoglyceride condensation products with lactic or glycolic acid can be prepared by interesterifying lactic acid and mono- and diglycerides under partial vacuum and elevated temperatures of approximately 300° F. They may also be prepared by reacting glycerin, fatty acid, and lactic or glycolic acid.

To prepare the stable hydrated emulsifier composition, an emulsifier selected from the group consisting of polyglycerol monoesters of fatty acids, monoacylglycerol esters of dicarboxylic acids, sucrose monoesters of fatty acids, polyol monoesters of fatty acids, phospholipids, and mixtures thereof, is heated above the melting point to liquify the material.

This melt is dispersed with high shear and cooling, said shearing and cooling being done either simultaneously or in sequence, into an aqueous medium to form a dispersion. The ratio of emulsifier to water being from 10:1 to 1:10, preferably from 8:1 to 1:8.

The water soluble food additives, i.e. flavors, flavor precursors, coloring dyes, color precursors, are predissolved in the water.

Similarly, the oils and oil soluble food additives are dissolved or dispersed in the emulsifier. The additional ingredients which are added to the emulsifiers, for example, fat or oil are preferably added at a temperature above the melting point of the emulsifier crystals and cooled with high shear mixing.

In forming the emulsion, it is required that the emulsifiers be in the form of a melt and then subjected to high shear prior to or during cooling.

The hydrated emulsifier compositions as prepared above can be incorporated within the food or beverage product or laminated on the surface of the food product.

The food additive composition is mixed with the texturized protein, binder, and water used to prepare a meat analog. No criticality exists with regard to the choice of texturized protein or binder material.

Soy protein particles, mixtures of gluten and soy particles, and other simulated meat products made from vegetable proteins, as well as animal proteins such as beef, pork, lamb, chicken, and milk can be used.

The binder can be derived from animal protein, for example, egg white, serum proteins, or from vegetable protein, for example, soy protein, the 7S fraction of soy, and cottonseed protein, among others.

Lipids are an important part of the proper gustatory quality of a meat analog, particularly a sausage analog. Fats or oils (of animal or preferably, vegetable origin) are added to a meat analog product, so that the product mimics meat in its physical and gustatory properties.

To prepare a meat analog, a texturized protein, lipid, binder, water mixture is prepared. The hydrated emulsifier composition is added, and this mixture is then shaped into a desired form, for example, patty, link, loaf, or granule, and then heat-set. Preferred methods of heat-setting are autoclaving, microwaving, griddle heating and oven heating.

In a preferred embodiment, the lipid (triglyceride) and a non-polar oil soluble emulsifier are mixed with the stable hydrated emulsifier composition before adding the triglyceride to the meat analog. From about 20% to about 80% of triglyceride and from about 10% to about 50% of non-polar oil soluble emulsifier by weight of the stable hydrated emulsifier composition is used.

This same triglyceride-emulsifier composition can be used in a margarine-type product.

On heating, the triglyceride melts and the system inverts to a fat or oil in water emulsion which is stable to about the boiling point of water (200° F.). This prevents the fat from being released during the cooking of the meat analog. Additionally, less fat is required to produce the desired fatty impression of the final product.

The flavor or color composition can be incorporated on the outer surface of the meat analog. This is particularly useful when the food additive component is meat, for example beef or sausage. From about 10% to about 80% of the real meat product, i.e., ground beef or ground sausage, or flavor precursors derived therefrom, are added to the hydrated emulsifier composition. This mixture is then placed on the outside of the meat analog so that under normal cooking conditions, the product browns, fat is released, and the flavor develops on the outside of the patty.

The following examples are meant only to illustrate the invention and not to limit it in any way.

EXAMPLE I

| Ingredients | Grams |
| --- | --- |
| Water | 1078.7 |
| Polyglycerol ester of palmitic acid | 461.8 |
| Pork flavor volatiles | 0.46 |

The flavor volatiles are blended with the polyglycerol ester which has been warmed to about 100° F. Water is added to this solution and the mixture heated to 140° F. using microwave energy. The mixture is then placed in a mechanical blender and blended for three minutes at ambient temperature, and then for 10 minutes at ice bath temperatures. The sides and bottom of the container are scraped periodically during both mixing periods.

A flavored emulsion which is in a liquid crystalline or mesophase state is produced. The emulsion is stable up to 190° F.

When whey solids (77.1 g) are mixed with the mesophase prepared above, the mesophase system turns brown on heating.

EXAMPLE II

| Ingredients | Grams |
| --- | --- |
| Lecithin | 12.7 |
| Hardstock | 38.0 |
| Pork flavor volatiles | 0.76 |
| Pork triglyceride | 707.6 |
| Whey solids | 38.0 |

The lecithin, hardstock and pork triglyceride are heated to 75° C. to solubilize the components. The flavor volatiles are then added to this fat solution, the mixture cooled to 45° C., and the whey solids are added using a blender at low speed.

The stable hydrated emulsifier system prepared in Example I is then added to the melted fat phase using a blender at low speed over a three-minute period. The dispersion is further mixed as follows: two minutes at low speed followed by six minutes at a medium speed. The sides of the containers are scraped periodically during the mixing.

The stable hydrated emulsifier system and oil dispersion prepared by the above method is birefringent under polarized light and is heat stable up to about 190° F. The product has a mild pork-like taste.

The product can be used to replace the fat (triglyceride) in a pork analog product. The fat level of such a product is about 50% lower than the real pork product.

EXAMPLE III

| Ingredients | % of Total (by Wt.) |
| --- | --- |
| Texturized gluten/soy granule | 5.53 |
| 30% Pork flavor solution | 5.53 |
| Water | 11.02 |
| Texturized soy protein | 8.27 |
| Cooked pork fat | 18.41 |
| Pork mince | 9.22 |
| Spices | 1.83 |
| Encapsulated fat | 18.41 |
| Egg white solids | 2.70 |
| Fat mixture of Example II | 4.61 |
| Spice mix | 0.67 |

| Ingredients | % of Total (by Wt.) |
|---|---|
| Pork sausage | 13.80 |

The gluten/soy granule, flavor solution, and water are combined and heated in a covered vessel for 20 to 60 seconds in a microwave unit to hydrate the granules. The texturized soy protein, fat, pork mince, spices, encapsulated fat prepared according to U.S. Pat. No. 3,729,325 issued to Howard, 1973, and egg white solids are added in sequence to the hydrated texturized gluten/soy granules using a one to two minute mixing step between each addition. This mixture is shaped into patties having dimensions of 2½ inches in diameter by ⅜ inch thick.

The pork sausage, spice mix and flavored emulsion as prepared in Example II are mixed together. Each patty is coated on each side with approximately 1/16 inch layer of this mixture. The patty is then heat-set on a griddle at 350° F. for six minutes. The patty tastes like pork sausage.

When the spice mix is left out and the pork products are replaced with beef products, a beef analog product resembling ground beef in taste and textural characteristics is produced.

EXAMPLE IV

Ingredients
1,3-dihydroxyacetone dimer
L-proline
Water
Triglycerol monopalmitate
Soybean oil
Propylene glycol monoestearate A 50% solution of the dihydroxyacetone dimer and L-proline in a ratio of 0.006 moles dimer to 0.005 moles proline was prepared (40 g). The triglycerol monopalmitate (10 g) is heated until it is liquified and then mixed with the aqueous solution for about 1 minute using the omnimixer.

The emulsion is then cooled using an ice-water bath and mixing is continued for about 1 minute to produce the hydrated emulsifier composition.

A 20% solution of propylene glycol monostearate in soybean oil (12.5 g total) is prepared by warming a mixture of the two to 140° F. The solution is cooled to about 85° F. and dispersed in the hydrated emulsifier composition prepared as above using an omnimixer. The mixing is done at the temperature of an ice-water bath for about 1 minute.

When this product is added to a meat analog product, the product "browns" when cooked in a microwave oven without a browning element.

What is claimed is:

1. A meat analog product comprising texturized protein material, binder, lipid and a food additive composition comprising:
   (a) an emulsifier selected from the group consisting of polyglycerol monoesters of fatty acids; monoacylglycerol esters of dicarboxylic acids; sucrose monoesters of fatty acids; polyol monoesters of fatty acids; phospholipids; and mixtures thereof;
   (b) water, the ratio of emulsifier to water being in the range of from 1:10 to 10:1; and
   (c) a food additive selected from the group consisting of flavoring agents; coloring agents, fats, sugars, ground meat, and mixtures thereof, said composition being in a liquid crystalline state which is stable from about 98° F. to about 200° F.

2. A composition according to claim 1 wherein the ratio of emulsifier to water ranges from 1:8 to 8:1.

3. A composition according to claim 1 wherein said emulsifier is selected from the group consisting of polyglycerol monoesters of $C_{14}$–$C_{18}$ fatty acids, sucrose monoesters of $C_{14}$–$C_{18}$ fatty acids, lecithin, polyol monoesters of $C_{14}$–$C_{18}$ fatty acids, and mixtures thereof.

4. A product according to claim 1 or 3 wherein said food additive composition contains ground meat and said food additive composition is on the outer side of said meat analog.

5. A product according to claim 1 or 3 wherein said food additive composition contains a triglyceride and meat flavor agents.

6. A product according to claim 5 wherein said food additive composition additionally contains a non-polar oil soluble emulsifier.

7. A product according to claim 6 wherein said non-polar oil soluble emulsifier is selected from the group consisting of $C_{12}$ to $C_{22}$ fatty acid monoesters of propanediol and the condensation products of monoglycerides and citric or lactic acids.

8. A composition according to claim 7 wherein said monoesters of propanediol are selected from the group consisting of propanediol monoesters of palmitic acid, stearic acid, oleic acid, linoleic acid, and mixtures thereof.

* * * * *